April 19, 1938.   P. BRÜNING   2,114,650
TENS CARRY MECHANISM
Original Filed May 27, 1931
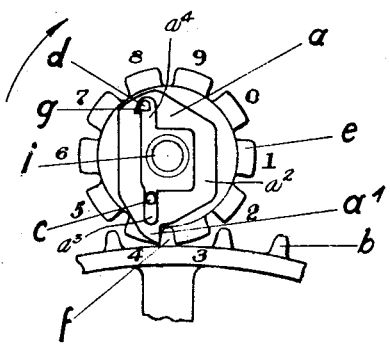
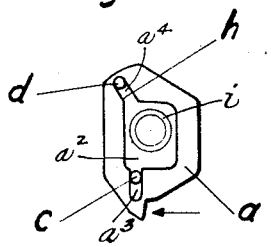
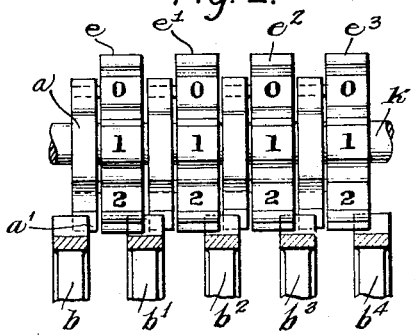
Inventor
Paul Brüning Patented Apr. 19, 1938

2,114,650

UNITED STATES PATENT OFFICE 2,114,650

TENS CARRY MECHANISM

Paul Brüning, Berlin, Germany

Application May 27, 1931, Serial No. 540,401. Renewed March 5, 1938. In Germany June 2, 1930

1 Claim. (Cl. 235—133)

The present invention relates to a tens carry mechanism for a totalizer of calculating machines. It is an object of the present invention to improve a member and its operation whereby this member will transfer a number from a wheel of lower denomination to a wheel of higher denomination by being locked against sliding and will slide when a wheel of higher denomination is actuated to prevent rotation of the wheel of lower denomination.

The invention will be clearly understood from the following description taken in connection with the accompanying drawing which shows in, Fig. 1 an end view of the mechanism, Fig. 2 a side view thereof, and in Fig. 3 a side view of a modified slide and its pins.

$a$ designates a slide member having an operating tooth $a^1$. $b$ is the operating wheel or pinion which drives a numeral wheel $e$. This wheel or pinion $b$ may be driven manually or by any other suitable means. Each numeral wheel $e$ has two pins $c$ and $d$ secured in one side thereof. These pins cooperate with the slots $a^3$ and $a^4$ in the slide member $a$. As shown in Fig. 2 any number of elements $a$, $b$ and $e$ may be provided and as illustrated numeral wheel $e^3$ is of lower denomination and $e^2$ is of higher denomination, and in connection therewith pinion $b^4$ cooperates with wheel $e^3$ and pinion $b^3$ with wheel $e^2$.

The slide member of Fig. 1 has a notch or shoulder $g$ formed by the slot $a^4$ but in Fig. 3 the slot $a^4$ is arranged oblique relative to slot $a^3$.

The slide member $a$ falls naturally into the positions shown in Figs. 1 and 3 but if desired any suitable means such as a spring may be employed to continuously urge the slide into the positions shown.

According to Fig. 3 the locking against slipping due to the operating force, is obtained by the locking action of the guide pin $d$ on the oblique surface $h$.

As shown in Fig. 2 the wheels $e$ to $e^3$ may be mounted on a shaft $k$ and a sleeve $i$ may also be provided as shown in Figs. 1 and 3.

The device is operative in an adding operation as follows. In adding, the wheel $b$ is turned clockwise as seen in Figure 1, or toward the operator in Figure 2 by manipulating these wheels with the fingers. Referring to Figure 2, the wheel $e^2$ for instance is turned, and will move counter-clockwise as seen in Figure 1. If the wheel $e^2$ passes from "9" to "0", the wheel $e^1$ must be turned by one increment to register the "carry". The slide member $a$ which has a transfer tooth $a^1$ formed as seen in Fig. 1 with a straight side and an oblique or cam side, the slide $a$ by means of the tooth $a^1$ will contact the tooth $f$ of the wheel $b^2$ in the passage from "9" to "0" of wheel $e^2$. With the wheel $e^2$ turning counter-clockwise as seen in Fig. 1, the straight side of tooth $a^1$ will contact against the tooth $f$ and will attempt to pivot the slide about its pivot $c$ in a clockwise direction. This will cause the shoulder $g$ to move against the pin $d$ and will couple the slide $a$ and wheel $e^2$ together. The wheel $b^2$ will thus be turned one step clockwise (Fig. 1) to transfer "1" to the wheel $e^1$ to thereby "carry" the amount of "9" to "0" from the wheel $e^2$.

However, when a wheel of higher denomination is set the wheel of lower denomination will be inoperative as follows.

When, for instance, the wheel $b^3$ is operated, if the wheel $e^3$ of lower order has been standing in such a position that the tooth $a^1$ of its slide $a$ were in the path of a tooth $f$ of the wheel $b^3$, this tooth $f$, as seen in Fig. 1, or actually the tooth next to the left of $f$, will be moving clockwise and will contact the oblique side of the tooth $a^1$. This movement will cause an opposite rocking of the slide $a$ than that effected in the carry operation just described. That is, the slide will be rocked counterclockwise about its pivot $c$, and this movement will release the pin $d$ from the shoulder $g$, and allow the slide $a$ to be cammed upwardly by the tooth $f$ to thus leave the wheel $e^3$ undisturbed while rotating the wheel $e^2$ to set a value therein. Thus when any so-called operating or adjusting wheel as $b^3$ is turned clockwise (as in Fig. 1) to enter a number into its associated tens-toothed registered wheel $e^2$, the slide $a$ to the left of wheel $e^2$ (Fig. 2) must be effective to transfer "one" to the higher order wheel $e^1$ through the tooth $a^1$ and wheel $b^2$, while the entering wheel $b^3$ must not be effective to turn a lower order wheel as $e^3$ an undesired movement thru the intermediary of a slide $a$ and tooth $a^1$ to the right of the wheel $e^2$ be actuated.

I claim as my invention:

A tens carry mechanism for a totalizer comprising in combination a wheel of lower denominational order and a wheel of higher order, a pinion for each wheel for operating the same; pins extending from one face of said lower order wheel on opposite sides of a diameter; and a member engageable with said pinion of higher order and mounted on said pins for slidable and rockable movement, said member being formed with slots to engage said pins and said slots being so formed that, when said member is rocked in one direction in a tens carry operation it will be held against sliding by said slots in engagement with said higher pinion but when rocked in the other direction in a numeral entry into the totalizer it will be slid on said pins out of engagement with said pinion.

PAUL BRÜNING.